(12) United States Patent
Kolb

(10) Patent No.: US 6,986,345 B2
(45) Date of Patent: *Jan. 17, 2006

(54) INSERTABLE THERMOTIC MODULE FOR SELF-HEATING CAN

(75) Inventor: Kenneth W. Kolb, Kajang (MY)

(73) Assignee: Expressasia Berhad (MY)

( * ) Notice: Subject to any disclaimer, the term of this patent is extended or adjusted under 35 U.S.C. 154(b) by 0 days.

This patent is subject to a terminal disclaimer.

(21) Appl. No.: 10/329,740

(22) Filed: Dec. 26, 2002

(65) Prior Publication Data

US 2003/0205224 A1 Nov. 6, 2003

Related U.S. Application Data

(63) Continuation of application No. PCT/US02/12740, filed on Apr. 23, 2002, and a continuation of application No. 10/003,877, filed on Oct. 25, 2001.
(60) Provisional application No. 60/288,184, filed on May 2, 2001.

(51) Int. Cl.
*F24J 1/00* (2006.01)

(52) U.S. Cl. .............................. 126/263.08; 126/263.09; 206/222

(58) Field of Classification Search ............ 126/263.09, 126/263.01, 263.05, 263.06, 263.07, 263.08, 126/261, 262; 426/112, 113, 114; 206/222, 206/219
See application file for complete search history.

(56) References Cited

U.S. PATENT DOCUMENTS

| | | | |
|---|---|---|---|
| 2,288,895 A | 7/1942 | Fink | 220/8 |
| 2,300,793 A * | 11/1942 | Martin | 126/263.08 |
| 2,327,447 A | 8/1943 | O'Brien | 220/20 |
| 2,746,265 A | 5/1956 | Mills | 62/94 |
| 2,850,006 A | 9/1958 | Karpalo | 126/262 |
| 3,094,981 A * | 6/1963 | Brewer | 126/263.05 |
| 3,213,932 A | 10/1965 | Gottfurcht et al. | 165/61 |
| 3,815,867 A | 6/1974 | Rein et al. | 251/61.3 |
| 3,874,557 A | 4/1975 | Porter | 222/80 |
| 3,970,068 A | 7/1976 | Sato | 126/263 |
| 4,501,259 A | 2/1985 | Apellaniz | 126/263 |
| 4,741,324 A | 5/1988 | Ina et al. | 126/263 |
| 4,762,113 A | 8/1988 | Hamasaki | 126/263 |
| 4,784,113 A | 11/1988 | Nagai et al. | 126/263 |

(Continued)

FOREIGN PATENT DOCUMENTS

WO WO 93/17928 A1 * 9/1993
WO WO 96/29255 9/1996

*Primary Examiner*—Josiah C. Cocks
(74) *Attorney, Agent, or Firm*—Jones, Walker, Waechter, Poitevent, Carrere & Denegre, L.L.P.

(57) ABSTRACT

A thermic module for a self-heating container. The container includes a bottom end with a cavity having internal walls formed therein for receiving the thermic module. The thermic module will be comprised of a first cup having plastic walls and containing a first chemical reactant. The module will also include a second cup containing a second chemical reactant and a dividing wall positioned between the first and second cups such that the first and second chemical reactants cannot mix. An end cap will be positioned below the second cup and will retain the second chemical reactant within the second cup. An actuator for puncturing the dividing wall will be positioned between the end cap and the dividing wall. Finally, the walls of the first cup are formed of a plastic of sufficient thinness and having a sufficiently low Vicat Softening Point such that the plastic walls will expand into contact with the internal walls of the container cavity upon mixing of the first and second chemical reactants.

25 Claims, 15 Drawing Sheets

U.S. PATENT DOCUMENTS

| | | | |
|---|---|---|---|
| 4,784,678 A | 11/1988 | Rudick et al. | 62/4 |
| 4,793,323 A | 12/1988 | Guida et al. | 126/263 |
| 4,802,343 A | 2/1989 | Rudick et al. | 62/294 |
| 4,895,135 A | 1/1990 | Hamasaki | 126/263 |
| 5,072,605 A | 12/1991 | Imazu et al. | 72/46 |
| 5,088,870 A | 2/1992 | Fukuhara et al. | 413/4 |
| 5,169,524 A | 12/1992 | Meiritz et al. | 210/232 |
| 5,255,812 A | 10/1993 | Hsu | 220/277 |
| 5,392,762 A | 2/1995 | Hsu | |
| 5,461,867 A | 10/1995 | Scudder et al. | 62/4 |
| 5,465,707 A | 11/1995 | Fulcher et al. | 126/263.08 |
| 5,483,949 A | 1/1996 | James | 126/263.05 |
| 5,542,418 A | 8/1996 | James | 126/263.06 |
| 5,555,741 A | 9/1996 | Oakley | 62/294 |
| 5,626,022 A | 5/1997 | Scudder et al. | 62/4 |
| 5,809,786 A | 9/1998 | Scudder et al. | 62/4 |
| 5,943,875 A | 8/1999 | Hymes | 62/294 |
| 5,946,930 A | 9/1999 | Anthony | 62/293 |
| 6,103,280 A | 8/2000 | Molzahn et al. | 426/109 |
| 6,134,894 A | 10/2000 | Searle et al. | 62/62 |
| 6,167,718 B1 | 1/2001 | Halimi et al. | 62/293 |
| 6,170,283 B1 | 1/2001 | Anthony | 62/294 |
| 6,178,753 B1 | 1/2001 | Scudder et al. | 62/4 |
| 6,266,879 B1 | 7/2001 | Scudder et al. | 29/890.035 |
| 6,305,407 B1 | 10/2001 | Selby | |
| 6,502,407 B1 | 1/2003 | Searle et al. | |
| 6,705,309 B2 | 3/2004 | Searle et al. | |

* cited by examiner

INSERTABLE THERMOTIC MODULE FOR SELF-HEATING CAN

This application is a continuation of International Application No. PCT/US02/12740, which was filed on Apr. 23, 2002 and which claims priority to U.S. patent application Ser. No. 10/003,877, filed on Oct. 25, 2001, and U.S. Provisional Application Ser. No. 60/288,184, filed on May 2, 2001, which are incorporated by reference herein.

1. BACKGROUND OF THE INVENTION

The present invention relates to self-heating cans or other containers holding beverages, food, medicine, epoxy resins and other materials that it is desired to heat before consuming or using. In particular, the present invention relates to an insertable thermotic module for such self-heating containers.

Containers may have integral or separate insertable modules for warming materials in the container, such as Japanese sake, coffee, or soup. Examples of such self-heating containers with integral thermic modules are disclosed in U.S. Pat. Nos. 5,461,867 and 5,626,022, issued to Scudder et al and an example of a separately insertable module is disclosed in U.S. Pat. No. 6,134,894 to Searle, et al. Such containers typically include an outer can or body, in which the food or beverage is sealed and an elongated cavity or chamber which extends into the container body from the bottom end. The cavity is sized to accommodate the thermic module. The thermic module normally contains two chemical reactants which are stable when separated from one another, but when mixed in response to actuation of the thermic module by a user, produce an exothermic reaction (or, alternatively, an endothermic reaction) and thereby heat (or cool) the contents of the container. This elongated cavity functions as both a chamber in which to contain the reaction and a heat-exchanger for transferring heat between it and the surrounding contents of the container body. The thermic module usually has two chambers, each of which contains one of the chemical reactants, separated by a breakable barrier such as metal foil. Typically, one of the reactants is a liquid, and the other is in a powdered or granular solid form. Calcium oxide (quicklime) and water are examples of two reactants known to produce an exothermic reaction to heat the container contents. Other combinations of reactants (e.g. ammonium nitrate and water) produce endothermic reactions to cool the container contents. The thermic module cavity is normally sealed by an end-cap. The outside of the end-cap will serve as an actuator button that a user may depress to initiate the heating or cooling. The end-cap typically has a pushrod or similar prong-like member that extends from the actuator button nearly to the breakable barrier. Depressing the actuator button forces the prong into the barrier, puncturing it and thereby allowing the reactants to mix. The heat produced by the resulting exothermic reaction (or, alternatively, used by a resulting endothermic reaction) is transferred between the reaction chamber of the thermic module and the contents of the container body by conduction. The internal walls of the cavity may be fluted or pleated to promote such heat conduction. Exothermic reactions also typically generate a gas and/or steam, which is allowed to escape through vents in the end of the container. The user inverts the container and, when the contents have reached the desired temperature, consumes the contents. The end of the container body opposite the cavity has a seal or closure, such as conventional beverage container pull-tab or pop-top, that may be opened and through which the user may consume the heated or cooled contents.

One of the disadvantages associated with prior self-heating containers which place the chemical reactants directly into the cavity (i.e. an integral thermic module) is that the reactants typically cannot reliably be placed pack within the cavity before the container is filled with a food or beverage and subjected to the normal sterilization process. This is because the heat of the sterilization process may damage the reactants. It is generally not desirable to fill, sterilize, and pack the thermic modules into the containers at the same location. This is because the risk of contamination from the chemical reactants and because of the expense operating the module packing step in the same sterile environment required for filling and sealing the food or beverage in the containers. The current practice when employing integral thermic modules is to fill the container with the food or beverage and sterilize the container at one location, and then transport the containers to a second location for combining the container with the integral thermic modules. In some instances, it may even be necessary to return the containers to the original location for labeling, distribution or warehousing.

To be commercially acceptable, self-heating containers must be able to raise the temperature of the product to sufficiently high and in a sufficiently short period of time. An unofficial minimum standard accepted by many in the industry for heating type containers is that the thermic module must be able to raise the contents of the container at least 40° C. in less than 180 seconds.

While patents such as U.S. Pat. No. 6,134,894 to Searle, et al. have disclosed separately formed modules which insert into the cavity of the container, these prior art modules still possess many disadvantages. For example, it is desirable to have the walls of the cavity and those of the thermic module in contact to maximize heat transfer. However, it is often difficult to manufacture thermic module to the exact tolerance which allows the module to readily slide into the cavity and at the same time perfectly fit against the internal walls of the cavity. And while metals such as aluminum have good heat transfer characteristics, inevitably an air gap occurs between the module sidewalls and the internal walls of the cavity and acts as an insulating barrier. Prior art devices such as discussed in the Searle patent suggest using gels to fill air gaps, but gels have limited shelf-life because they tend to dry out.

It would be highly desirable to manufacture the modules from a material less expensive than metal, such as plastic. However, it has generally been accepted in the industry that the low thermal conductivity of plastics renders it totally impractical for a plastic thermic module to heat a container's contents to the desired 40° C. in less than 180 seconds. It is not believed that the prior art separately formed thermic modules are capable of reliably achieving this temperature/time requirement, particularly when dealing with standard sized soft drink cans. Therefore, a separately formed module capable of achieving this temperature/time standard would be an important and significant improvement in the art.

2. SUMMARY OF THE INVENTION

The present invention comprises a thermic module for a self-heating container. The container includes a bottom end with a cavity having internal walls formed therein for receiving the thermic module. The thermic module will be comprised of a first cup having plastic walls and containing a first chemical reactant. The module will also include a second cup containing a second chemical reactant and a dividing wall positioned between the first and second cups such that the first and second chemical reactants cannot mix. An end cap will be positioned below the second cup and will retain the second chemical reactant within the second cup. An actuator for puncturing the dividing wall will be positioned between the end cap and the dividing wall. Finally, the walls of the first cup are formed of a plastic of sufficient thinness and having a sufficiently low Vicat Softening Point such that the plastic walls will expand into contact with the internal walls of the container cavity upon mixing of the first and second chemical reactants.

Another embodiment of the present invention will include a pressure activated vent used in combination with the container such that the pressure created within the module by the mixing of the first and second reactants must exceed about 2 psi before the vent is activated.

A still further embodiment of the present invention includes forming the first cup from a frame structure having a top and side windows and covering these windows with a sheeting material such as metal foil.

3. BRIEF DESCRIPTION OF THE DRAWINGS

4. DETAILED DESCRIPTION OF THE INVENTION

Figure 1A:
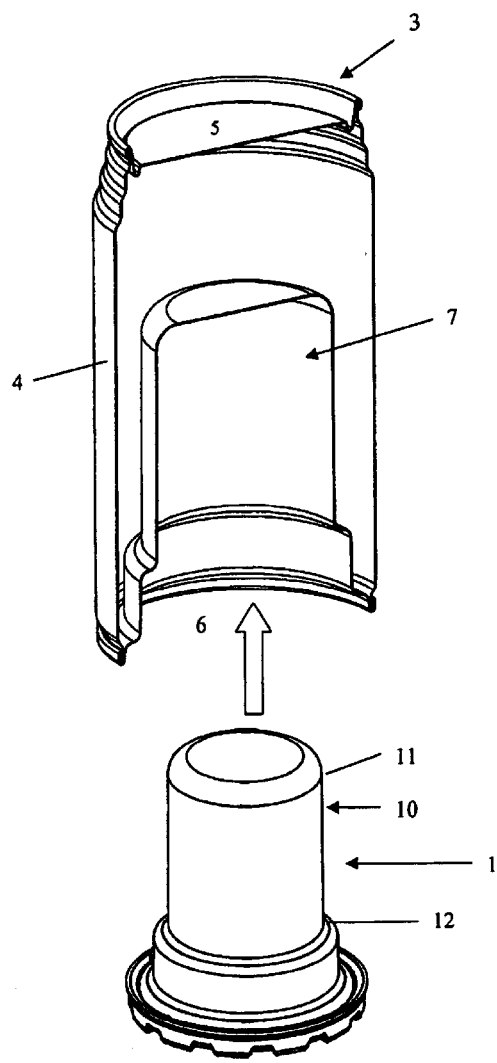
FIG. 1A is a partial sectional view of a self-heating container and insertable thermic module of the present invention.
Figure 1B:
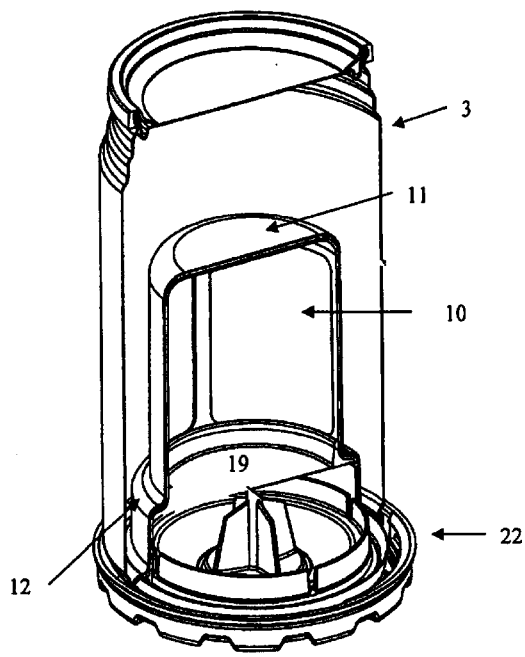
FIG. 1B is combined sectional view of the self-heating container and thermic module.
Figure 2:
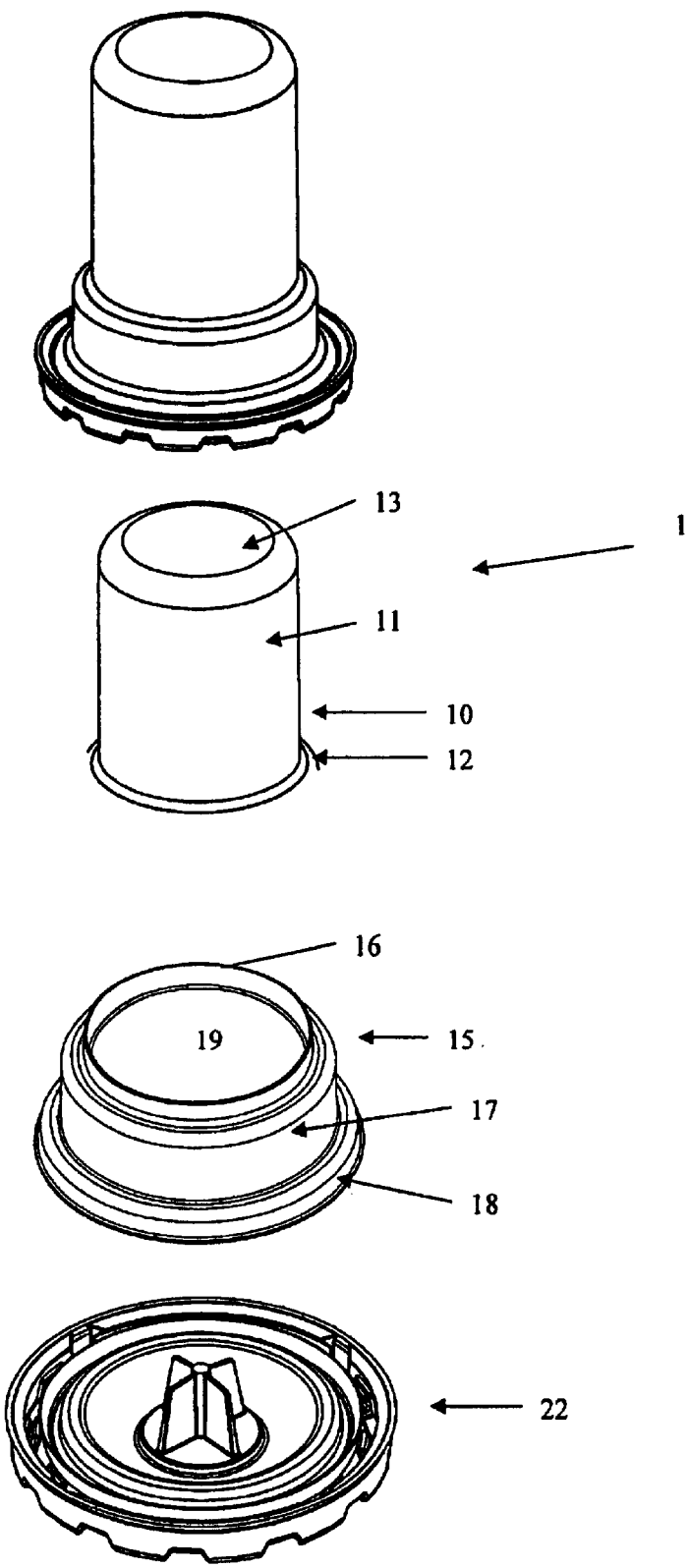
FIG. 2 is an exploded view of the thermic module of the present invention.

FIG. 1A illustrates a self-heating container 3 formed by outer sidewalls 4, top 5, and inner wall 7. While not shown, it will be understood that top 5 may include a conventional pull tab or pop top opening such as found on typical soda cans. It can be seen how inner wall 7 is generally cylindrical and forms a chamber or cavity 6. While not explicitly shown, the interior wall of cavity 6 may be fluted to provide more surface area to facilitate heat transfer from the thermic module 1 to the contents of container 3. Thermic module 1 is sized such that it can be inserted into cavity 6 as suggested by FIG. 1B. The main components of thermic module 1, upper cup 10, lower cup 15, and end cap 22 are best seen in FIGS. 1B and 2. First or upper cup 10 will be formed of a generally cylindrical sidewall 11 and integral top 13. Upper cup 10 will also have a cup lip 12 extending around the base of sidewall 11. It can be seen in FIG. 1B how the interior of upper cup 10 is hollow. FIG. 2 also shows second or lower cup 15, which includes pressure fit ring 16, cylindrical sidewall 17, and a bottom rim 18. The top of lower cup 15 will be formed by breakable barrier 19 which will be explained in more detail below.

Figure 3A:
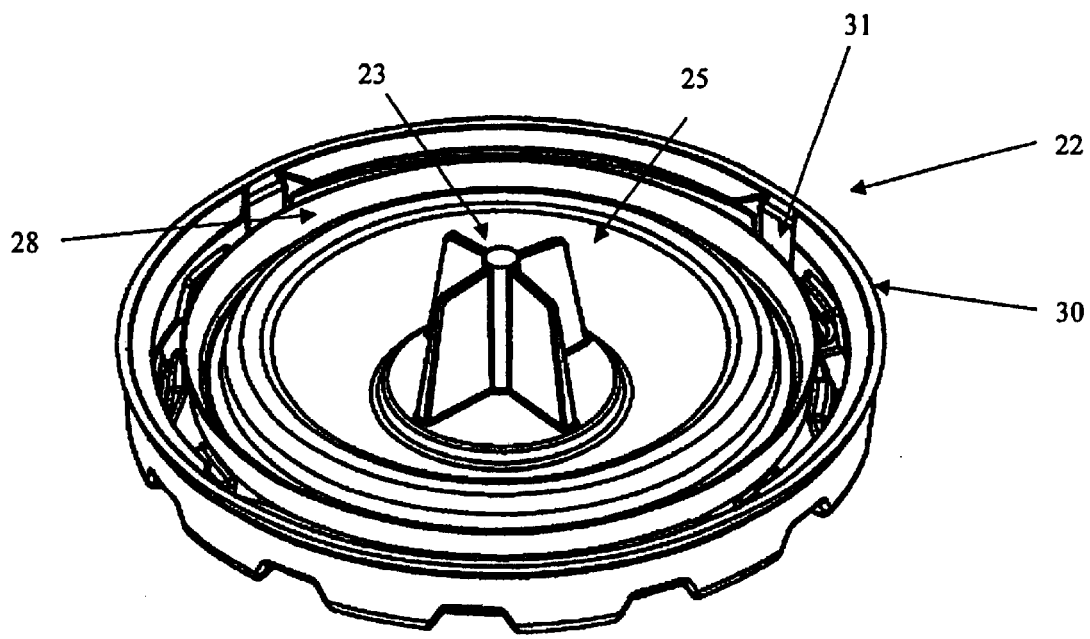
FIG. 3A is a top perspective view of the end cap of the thermic module.
Figure 3B:
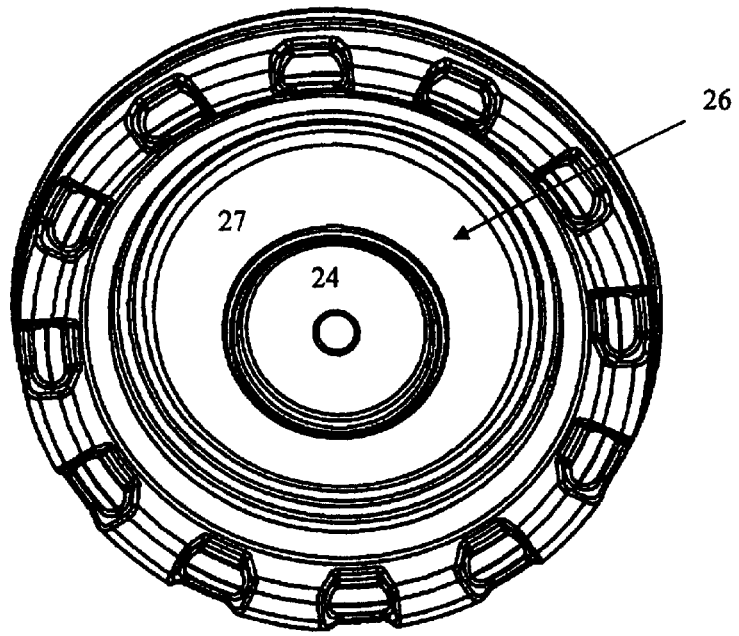
FIG. 3B is a bottom perspective view of the end cap of the thermic module.
Figure 3C:
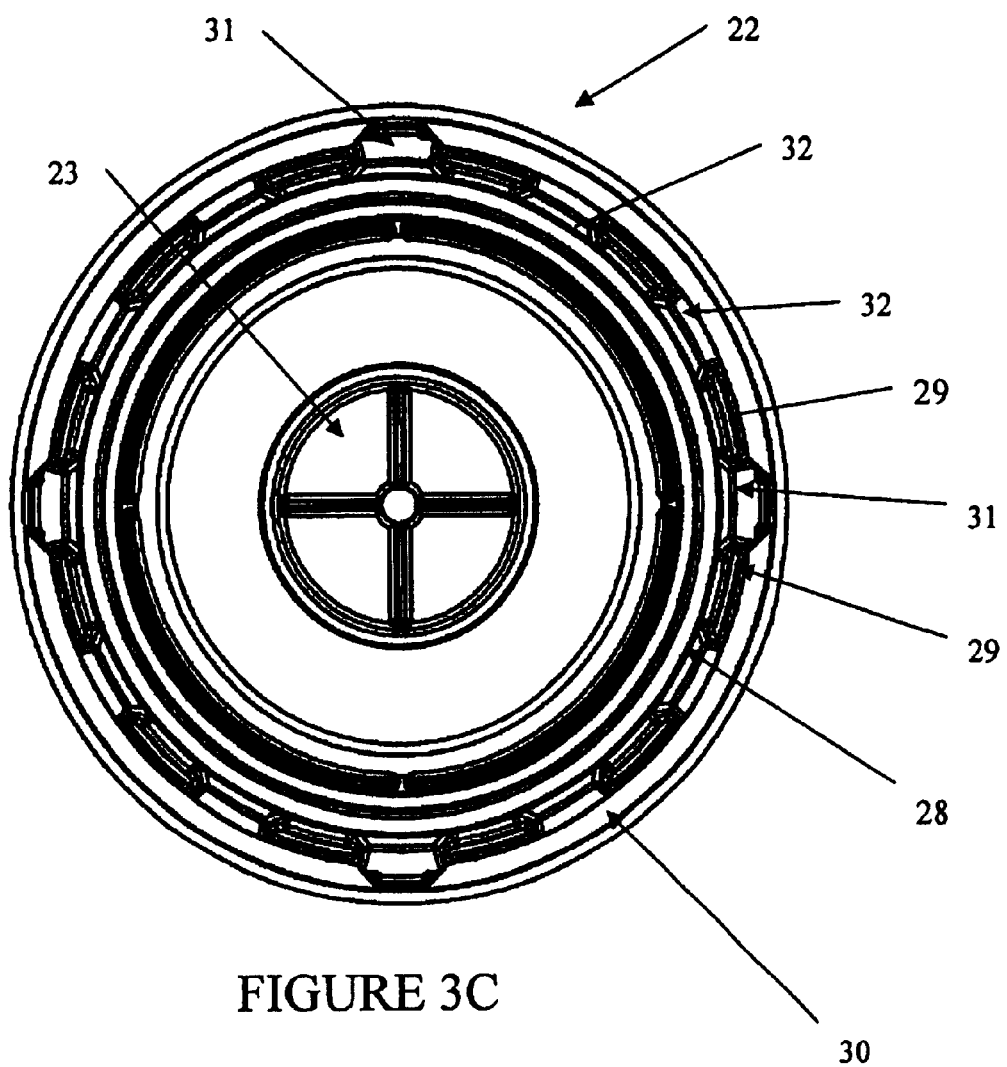
FIG. 3C is a top planar view of the end cap of the thermic module.
Figure 4:
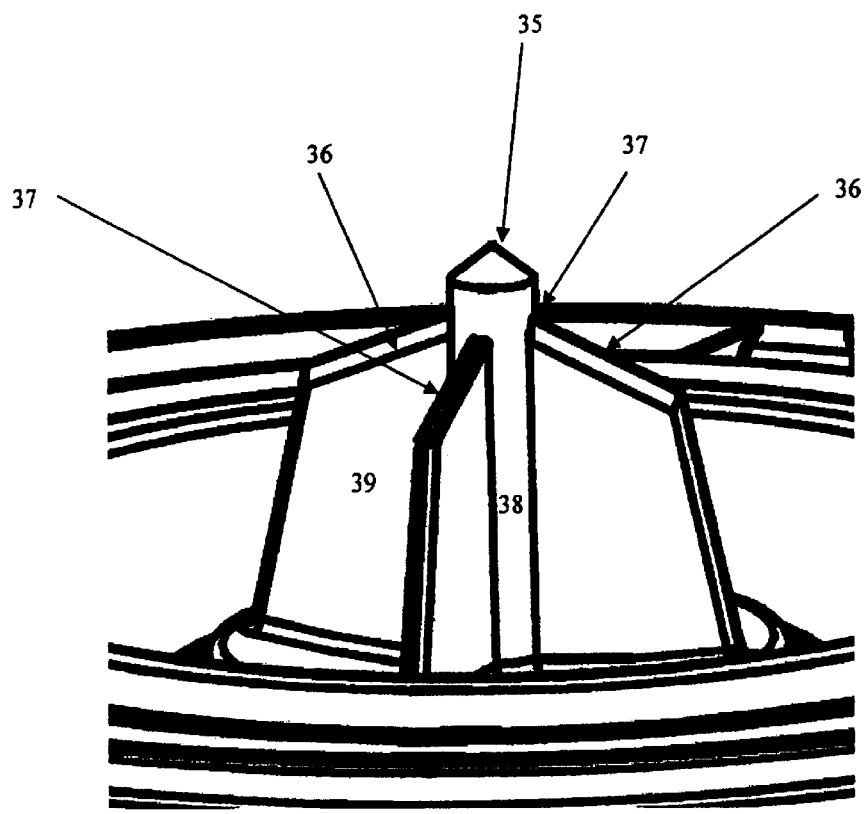
FIG. 4 is a view of the actuator attached to the end cap.
Figure 10A:
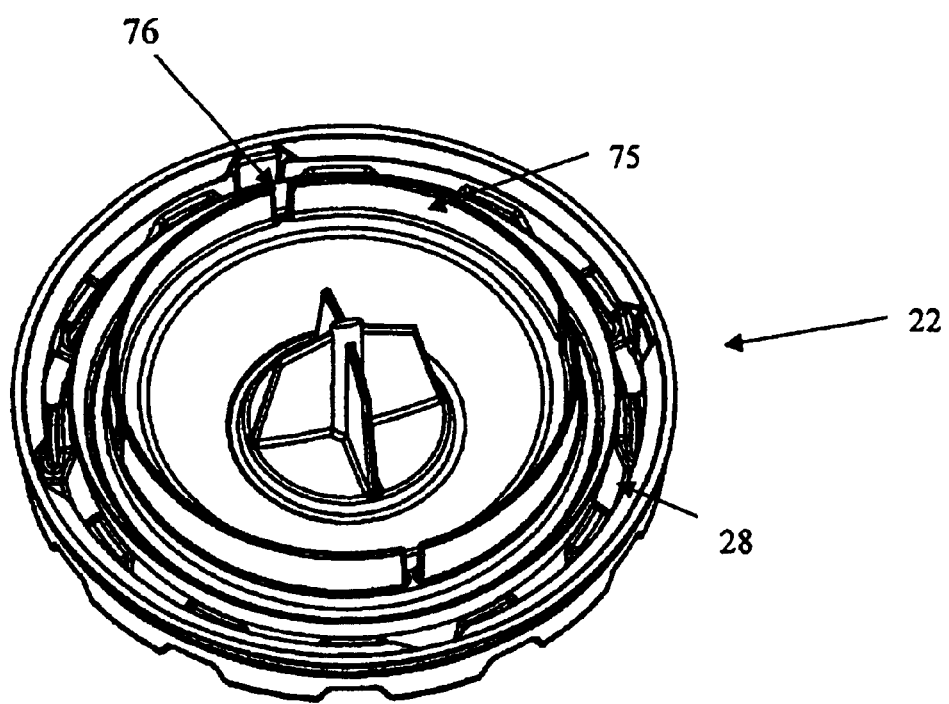
FIG. 10A is a perspective view of an alternate embodiment of the end cap.
Figure 10B:
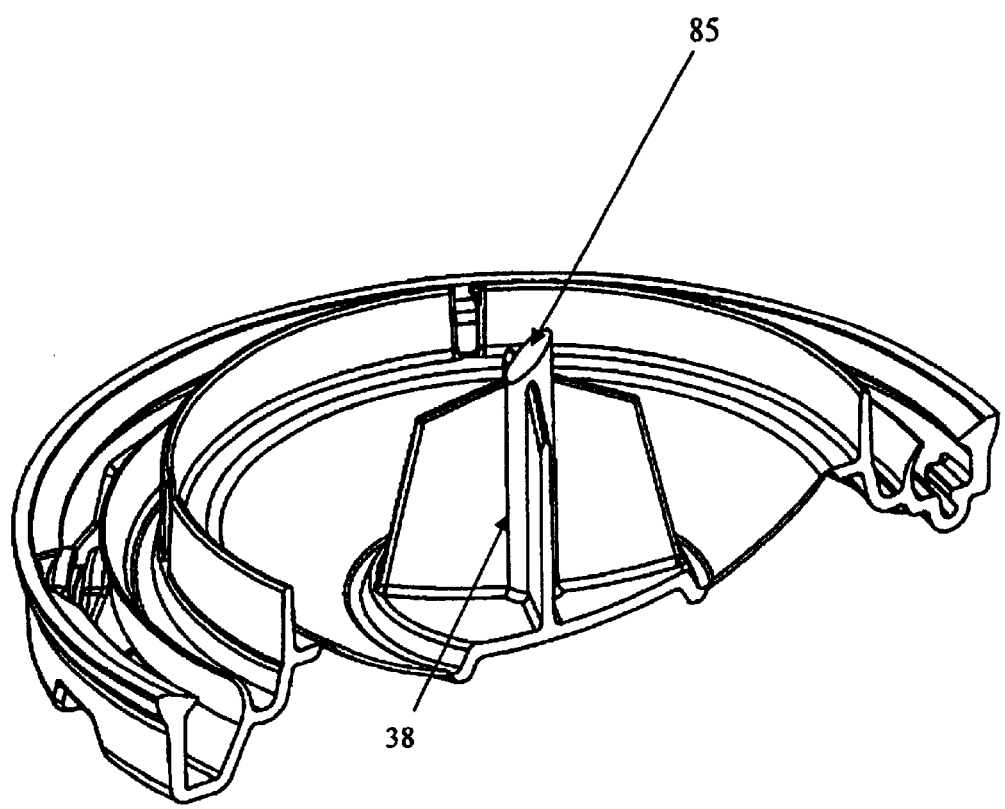
FIG. 10B is an enlarged view of the piercing point in an alternate embodiment of the actuator.

End cap 22 shown in FIGS. 1A and 2 is best seen in FIGS. 3A–3C. FIG. 3A shows how the top side 25 of end cap 22 will include actuator 23, pressure vent seal 28, can attachment pressure grip 30, and container body vents 31. FIG. 3C best illustrates two further elements of end cap 22: lower cup vents 32 and container snap grips 29. Bottom side 26 of end cap 22 seen in FIG. 3B illustrates how end cap 22 will be formed of a mid-section 27 with an actuator button 24 centered therein. Mid-section 27 will be formed of a sufficiently flexible material which will allow actuator button 24 to be easily moved inward when force is applied thereto. It will be understood that actuator button 24 on bottom side 26 is immediately opposite actuator 23 located on top side 25. Actuator 23 extends upward from top side 25 of end cap 22 and further includes the elements shown in FIG. 4. Actuator 23 will comprise a center post 38 with a sharp piercing point 35 formed on its top. In the embodiment shown in FIG. 4, four fins 39 will extend from center post 38, but naturally the invention encompasses designs with fewer or more fins 39. Two of the fins 39 will have sharp cutting edges 36 formed at their tops. The other two fins 39 will have more rounded spreading edges 37 formed at their top. In a preferred embodiment, actuator 23 will be formed at a height such that it nearly touches breakable barrier 19, for example the top of actuator 23 being about 2 mm+−1 mm away from breakable barrier 19. However, this is a preferred height and other heights of actuator 23 are intended to come within the scope of the present invention. A preferred embodiment of the piercing point on center post 38 is seen in FIG. 10B. This figure illustrates a sloped blade edge 85 formed thereon. This embodiment of center post 38 will exhibit a superior ability to pierce breakable barrier 19, but will still include fins with cutting and spreading edges extending away from center post 38.

Figure 9:
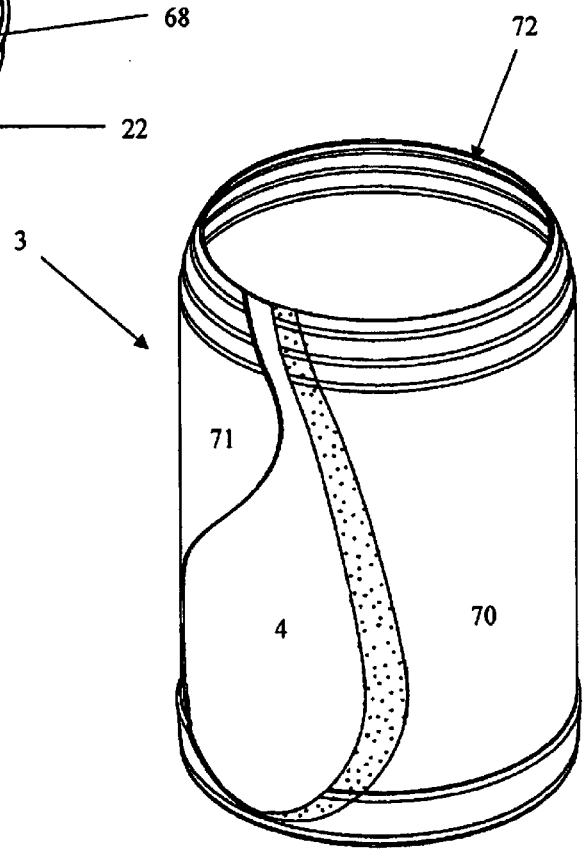
FIG. 9 is a perspective view showing the insulating sleeve which will typically cover the container.

FIG. 1A shows container 3 and thermic module 1 in the assembled state with thermic module 1 having been inserted into cavity 6. Thermic module 1 itself has been assembled by inserting lower cup 15 into the bottom of upper cup 10 such that upper cup lip 12 slides over the top of pressure fit ring 16 of lower cup 15. End cap 22 then engages the lower edge of container side wall 4 and bottom rim 18 of lower cup 15 and is secured thereto as described below. FIG. 9 illustrates how container 3 may also include a sleeve of insulation material 70 such as corrugated cardboard, a plastic shrink wrap cover 71 containing the container label and other printed matter, and a plastic top rim 72 to prevent excessively warm metal from contacting a drinker's lips.

Figure 5A:
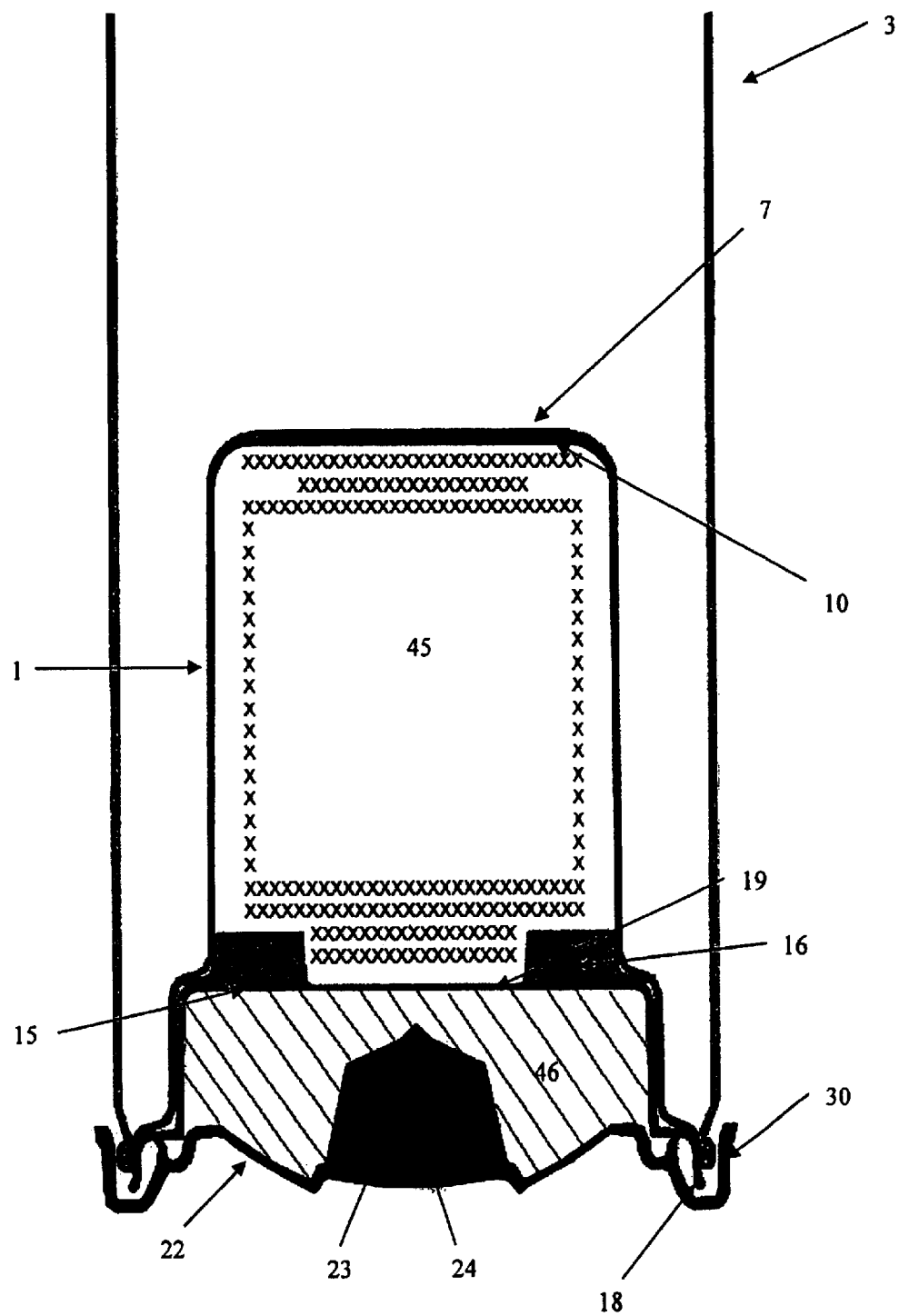
FIG. 5A is a cross-sectional schematic of the thermic module containing chemical reactants.

The operation of thermic module 1 may be understood with reference to the cross sectional view of FIG. 5A. This figure illustrates container 3 having thermic module 1 inserted therein. The interior of upper cup 10 is filled with a first chemical reactant 45 which is a solid material in one preferred embodiment of the invention. Lower cup 15 is shown filled with a second chemical reactant 46 which is a liquid material is this embodiment. The joint between upper cup lip 12 and pressure fit ring 16 is hermetically sealed to prevent the unintentional mixing of reactants 45 and 46. To activate thermic module 1, force is placed on actuation button 24 which causes actuator 23 to engage and penetrate breakable barrier 19. When the force is released from actuator button 24, it will flex back to its original position and reactants 45 and 46 will be allow to mix through the puncture in barrier 19. The mixing of reactants 45 and 46 will begin the exothermic reaction which will eventually heat the content of container 3 to the desired temperature.

One aspect of the present invention involves the type and quantity of reactants 45 and 46. While it is know in the art for reactant 45 to comprise calcium oxide (or "quicklime") and reactant 46 to comprise water, it has been discovered that particular ratios of water to quicklime will more efficiently create heat for transfer to the contents of container 3. This is of particular importance when dealing with a standard soda-sized can which must accommodate 210 ml of beverage, thus leaving approximately 115 ml of volume to form cavity 6 and house insert 1. In order to obtain the desired heating of 210 ml of liquid by 40° C. in less than 180 seconds, one preferred ratio of water to quicklime is 27 g water to 74 g quicklime to give a the total weight of water to total weight of quicklime ratio of approximately 0.36. However, a wider range of ratios such as between about 0.30 and 0.40 or even between about 0.2 and 0.50 may generate the desired heating in the desired time if, as is explained further below, pressure is generated within the thermic module and/or the optimal materials are used to construct the thermic module. Typically, the minimum weight of quicklime to heat 210 ml of fluid should be approximately 55–60 g.

One preferred form of quicklime comprises a minimum of 91.0% total CaO, a maximum of 2.0% MgO, a maximum of 2.0% CO2, a maximum of 0.5% SiO2, a maximum of 0.2% Fe2O3, a maximum of 0.2% Al2O3, and a maximum of 5.0% CaCO3. The quicklime has a hardness of about 2.5 to 3.0 on Moh's scale and a specific gravity of 3.0–3.3. The granuals of the quicklime will range in average diameter from about 0.5 to 6 mm, or more preferably about 1 to 5 mm, or most preferably having a majority of granuals being approximately 2–3 mm. Quicklime meeting the specifications described above is available from MCB Industries located in Perak, Malaysia. This type of quicklime is generally not the fastest reacting quicklime available, but does have the favorable characteristic of tending to provide a steady increase in temperature during the reaction period. Additionally, while pure water and quicklime are in many cases suitable reactants, it is well known to add different chemical agents to the water and/or quicklime in order to vary different parameters of the reaction process. All such modifications of the water and/or quicklime reactants are intended to come within the scope of the present invention.

Figure 5B:
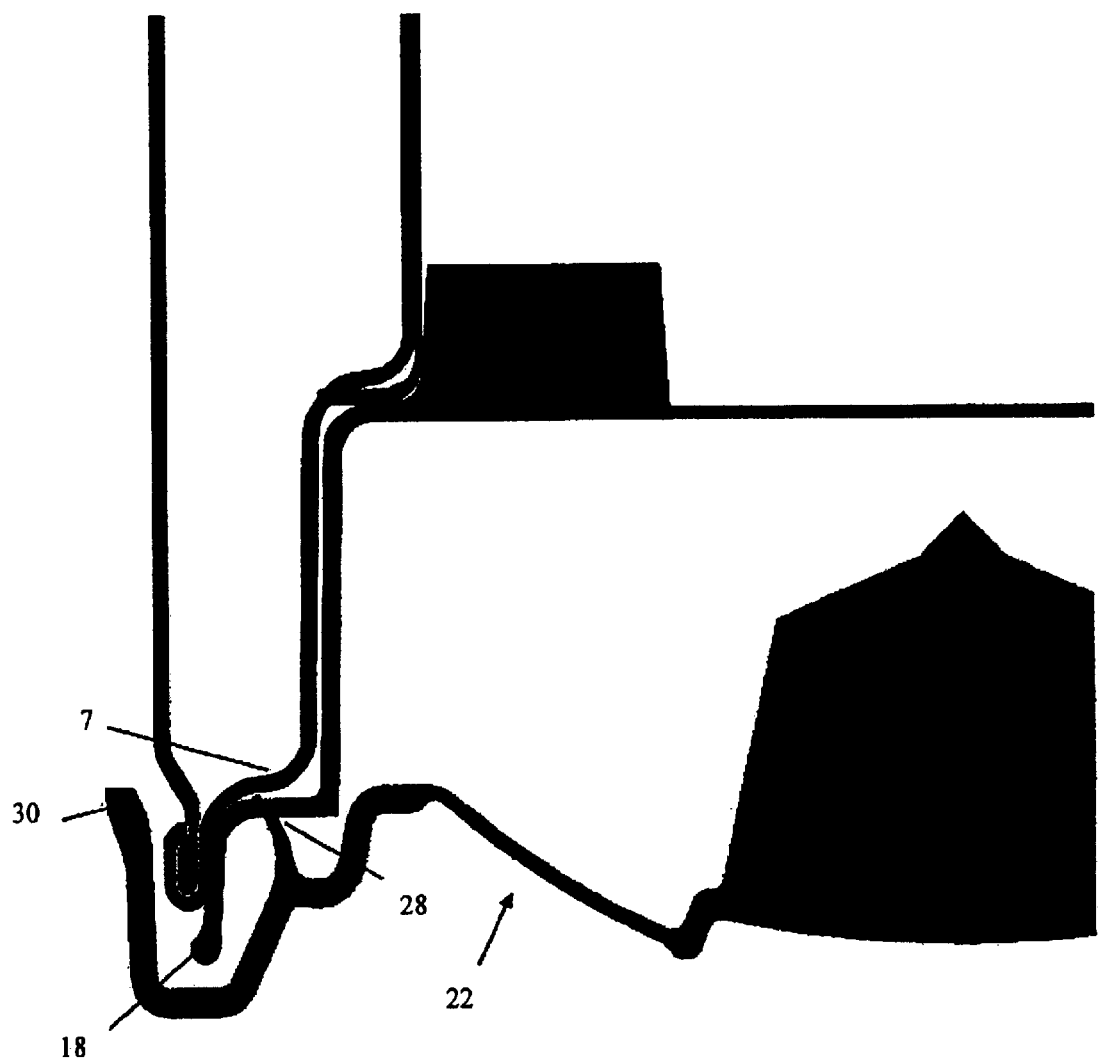
FIG. 5B is a detailed view of the container wall showing a section taken through the container body vent formed in the end cap.
Figure 5C:
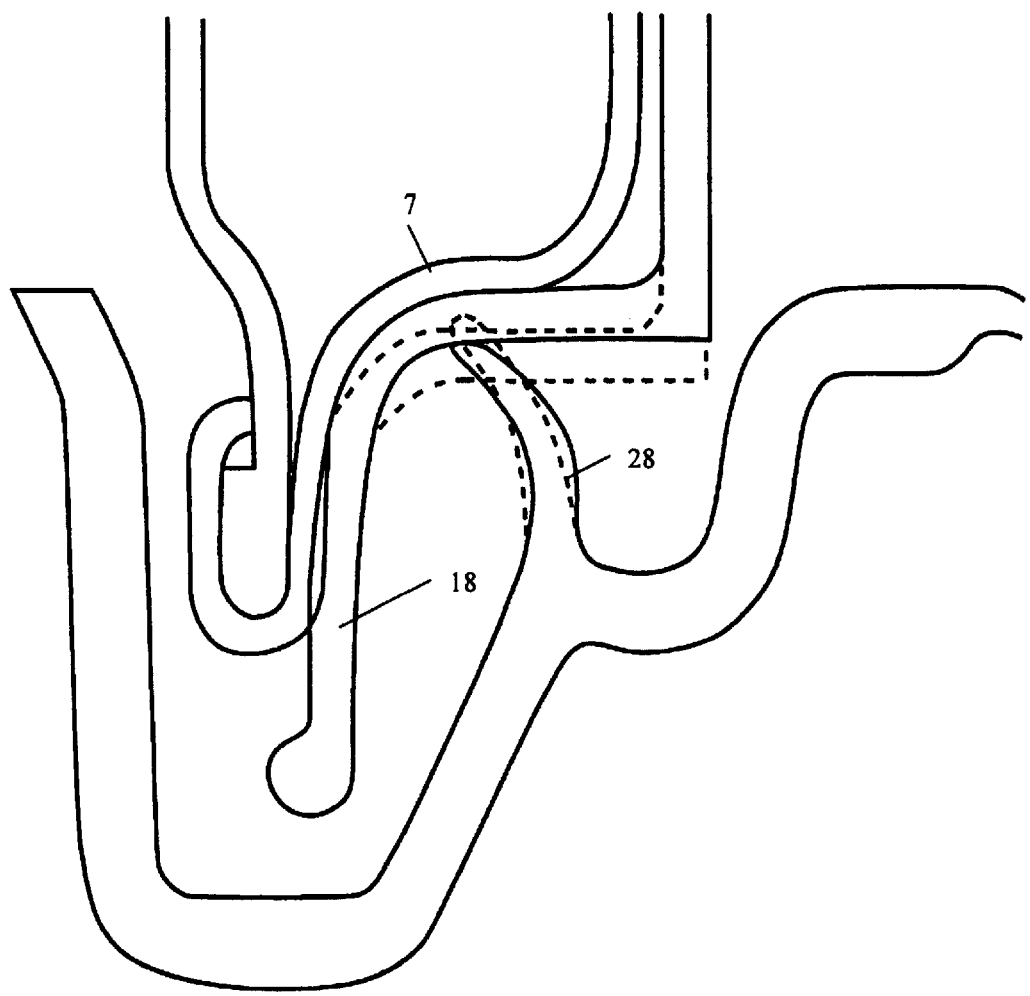
FIG. 5C is similar to FIG. 5B, but illustrates the deformation of the pressure vent seal formed in the end cap.
Figure 5D:
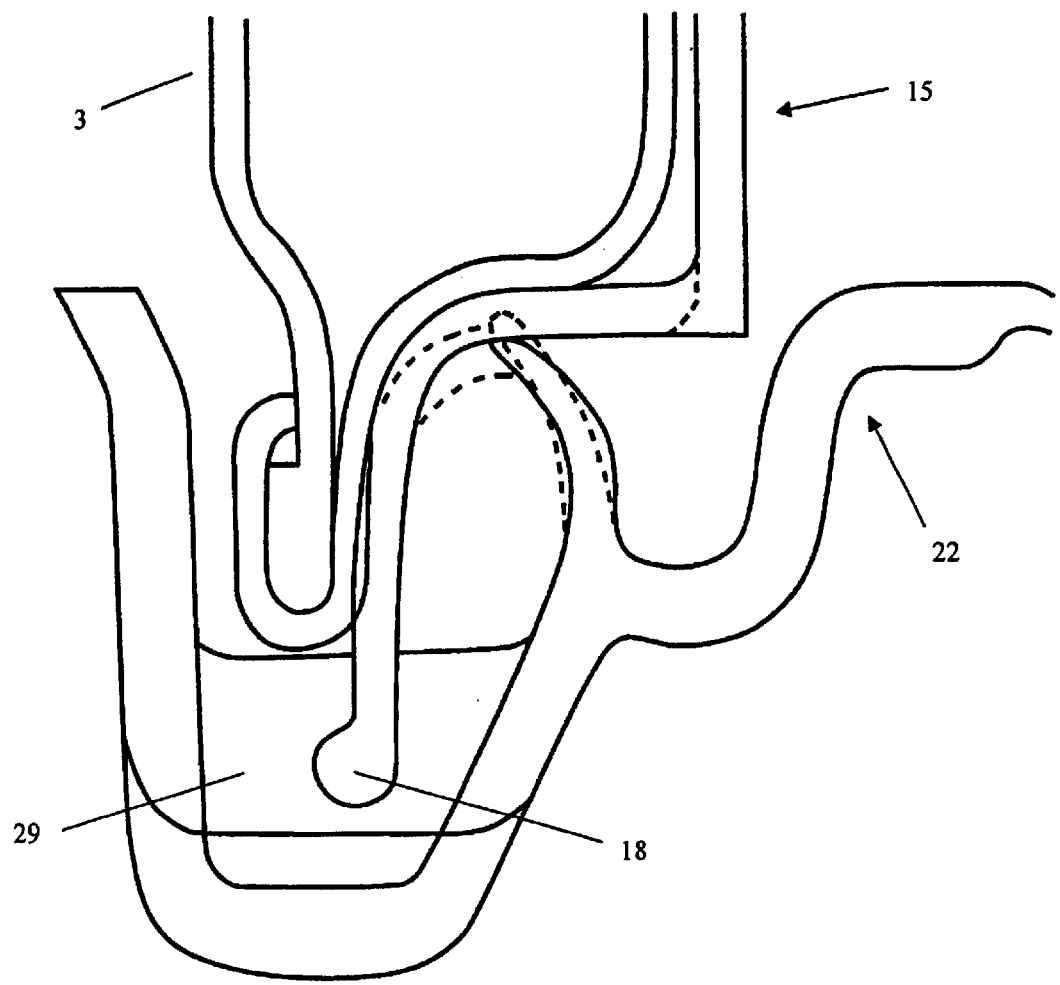
FIG. 5D is another sectional view taken through the snap-grip formed in the end cap.

Another aspect of the present invention involves creating a pressure seal within thermic module 1 in order to raise the temperature during the reaction of the water and quicklime. At zero gauge pressure, the water changes phase at 100° C. and the core temperature in the thermic module does not rise much above that mark. However, by sealing the thermic module and allowing the internal pressure to rise, the temperature in the thermic module may be increased. For example, a pressure of 5.5 to 6 psi gauge has been found to raise the temperature in the module to 108 to 110° C. However, even 2 psi will contribute to greater heating although it generally may not be practical to allow the pressure to exceed about 7 to 8 psi gauge. FIG. 5B is a detailed view of how pressure vent seal 28 of end cap 22 will be in a position to press against bottom rim 18 of lower cup 15. The dashed lines in FIG. 5C show vent seal 28 when it is in a relaxed state and has not been pressed against bottom rim 18. The solid lines illustrate how vent seal 28 is slightly deformed and pressed firmly against bottom rim 18 after end cap 22 is placed on the bottom of container 3 and snap grip 29 securely grasps the bottom edge of rim 18 as seen in FIG. 5D. Vent seal 28 also tends to press sidewall 17 of lower cup 10 into cavity wall 7, thereby preventing steam from escaping between lower cup 10 and cavity wall 7. Initially, as pressure increases within thermic module 1, vent seal 28 remains in place and is able to contain the increasing pressure. However, as the pressure reaches 5 to 7 psi, vent seal 28 is designed to fail and fold backwards. While there is not sufficient space for escaping gas to move past the connection of bottom rim 18 and snap grips 29 as seen in FIG. 5D, the space provided by chemical cup vents 32 and body container vents 31 (see FIG. 5C) will allow gas to escape under bottom rim 18 once vent seal 28 has been deflected. Gases flowing into chemical cup vents 32 will be able to flow laterally to reach the nearest body container vent 31. When the steam enters body container vents 31, it will be directed up the sides of end cap 22 and between the corrugated insulating sleeve 70 (FIG. 9) and the sidewall 4 of container 3. This aids in transferring more of the escaping heat to the container contents before the steam (much cooled) is eventually dispersed slowly from the top of insulating sleeve 70 near the top of the container. This also prevent excessively hot steam escaping directly out of end cap 22 and potentially scolding the user of the container. Because the present invention increases pressure within module 1, wider variations in the water to quicklime ratios may be tolerated and still achieve the desired degree of heating in the desired time limits.

While most of the water reactant will either combine with the quicklime or be turned to steam, in certain instances small amounts of water may be remaining in end cap 22 as the pressure begins to vent. When using the end cap 22 seen in FIG. 3, this end cap may have the undesirable effect of allowing the venting steam to drive the small amount of water out of end cap 22, causing the base of the can to sputter small amounts of hot water. This would be a commercially undesirable effect. To prevent this phenomenon, an alternate embodiment of end cap 22 is shown in FIG. 10A. Positioned on the inside perimeter of pressure vent seal 28 is a ridge ring 75. Ridge ring 75 will have a plurality of gaps 76 formed along its perimeter. While not shown in the Figures, it can be understood how ridge ring 75 will fit against the inside wall of lower cup 10 when the thermic module is assembled. If the outside diameter of ridge ring 75 is approximately equal to the inside diameter of lower cup 10, the gaps 76 will allow ridge ring 75 to flex slightly inward and insure a tight fit against lower cup 10. It has been found that ridge ring 75 successfully prevents any water retained in end cap 22 from being sputtered out from the bottom of the can when the pressure is vented from the thermic module during operation.

A still further inventive aspect of the present invention is the material from which thermic module 1 is constructed. As mentioned above, a serious limitation of prior art thermic inserts was the difficulty in insuring contact between the inner wall of the cavity and the wall of the thermic module.

Additionally, the prior art has generally considered a thermic module constructed of plastic to be impractical due to the poor heat transfer properties of plastics. However, the present invention has overcome these limitations and provides a effective thermic insert constructed of plastic.

Referring back to FIG. 2, upper cup 10, lower cup 15 and end cap 22 will all be constructed of plastic in one preferred embodiment of the present invention. It is important that upper cup 10 be of a plastic type and thickness that exhibit several characteristics. First, at standard temperatures and pressures, upper cup 10 should have sufficient strength and be sufficiently rugged that thermic module 1 may be easily be manufactured in one location and then transported to another for insertion into container 3 when assembling the complete self-heating heating container. Naturally, upper cup 10 should also be capable of withstanding rigorous handling by workers who are assembling the completed self-heating container. Additionally, upper cup 10 should be impermeable to water and water vapor. At the same time, when thermic module 1 is heated and internal pressure builds, the plastic of upper cup 10 should be sufficiently thin and ductile such that it uniformly expands into contact against virtually the entire inner wall of cavity 6.

To achieve these characteristics, applicant has found that the plastic from which upper cup 10 is formed should have plasticity qualities which may be defined by the Vicat Softening Point (VSP) and that the walls of various elements of the module should have a certain range of thicknesses. While the present invention is not limited to a particular plastic compound, a preferred embodiment of upper cup 10 is constructed of polyvinyl chloride (PVC) or polystyrene (PS), ideally through a vacuum forming process. However, other plastics, including but not limited to low density polyethylene, high density polyethylene, polypropylene, or even rubberized plastics or latex plastics may be suitable under certain circumstances for the various elements of module 1. Additionally, the walls of upper cup 10, like the walls of other elements of module 1, could vary between about 0.001 mm to 0.65 mm depending upon the type of plastic used. More preferably, these wall thickness will vary from about 0.05 to 0.3 mm. In regards to upper cup 10, one preferred embodiment will have a will thickness less than about 0.2 mm.

The Vicat Softening Point (VSP) or Vicat Softening Temperature is a standard test (see ASTM D 1525, ISO 306) to determine at what temperature a plastic reaches a certain degree of plasticity. More specifically, the Vicat softening temperature is the temperature at which a flat-ended needle penetrates the specimen to the depth of 1 mm under a specific load. The test procedure generally entails placing a test specimen in the testing apparatus so that the penetrating needle rests on its surface at least 1 mm from the edge. A load of 10N or 50N is applied to the specimen. The specimen is then lowered into an oil bath at 23 degrees C. The bath is raised at a rate of 50° or 120° C. per hour until the needle penetrates 1 mm. The temperature at the 1 mm penetration reflects the point of softening which may be expected when a material is used in an elevated temperature application. The elements of thermic module 1 could be constructed of plastics having a VSP of between about 20° or 140° C., but it is more preferable to use plastics having a VSP of about 60° or 120° C. In one preferred embodiment, the VSP of the less than 0.2 mm wall of upper cup 10 will have a VSP of less than 90° C. It will be understood that VSP and wall thickness may vary from embodiment to embodiment and that the acceptable range of VSP and wall thicknesses are inter-related. For example, when dealing with a plastic having a higher VSP, the walls of the cup will need to be thinner to insure the walls expand properly when heated by the mixed reactants. Conversely, a plastic with a lower VSP would allow the use of thicker walls while still obtaining the desired expansion during heating. The important consideration is that the combination of these properties should provide an upper cup 10 having the characteristics listed above. The cup should be rigid enough to withstand normal handling when at standard temperatures and pressures, but the cup should become plastic and expand against the internal walls of the cavity as it is subject to the heat and internal pressure caused by the reaction of the water and quicklime upon activation of thermic module 1.

Lower cup 15 will be constructed to have different characteristics from upper cup 10. It is not intended that lower cup 15 deform under the heat and pressure of the quicklime's chemical reaction and lower cup 15 should also be impermeable to water and water vapor. Therefore, a preferred embodiment of lower cup 15 will be formed of high density poly ethylene (HDPE) through an injection molding process. However, lower cup 15 could be formed of other plastics such as PP or ABS, as long as the other plastics exhibit the functional characteristics described herein. For example, one suitable copolymer is produce by TPC Corporation located in Singapore and is sold under the band name "COSMOPLENE" and the manufacturer number AX164 AED314 A04069. It is desirable for the material of lower cup 15 to have a VSP of at least 120° C. and for sidewall 17, pressure fit ring 16 and bottom rim 18 to be at least about 0.3 mm in thickness. On the other hand, breakable barrier 19 will generally be approximately 0.2 mm thick. While breakable barrier 19 must be thin enough to be readily punctured by actuator 23 and allow water in lower cup 15 to enter upper cup 10, barrier 19 (even when punctured) should remain rigid enough to generally retain the quicklime in upper cup 10 as the reaction takes place.

Figure 11:
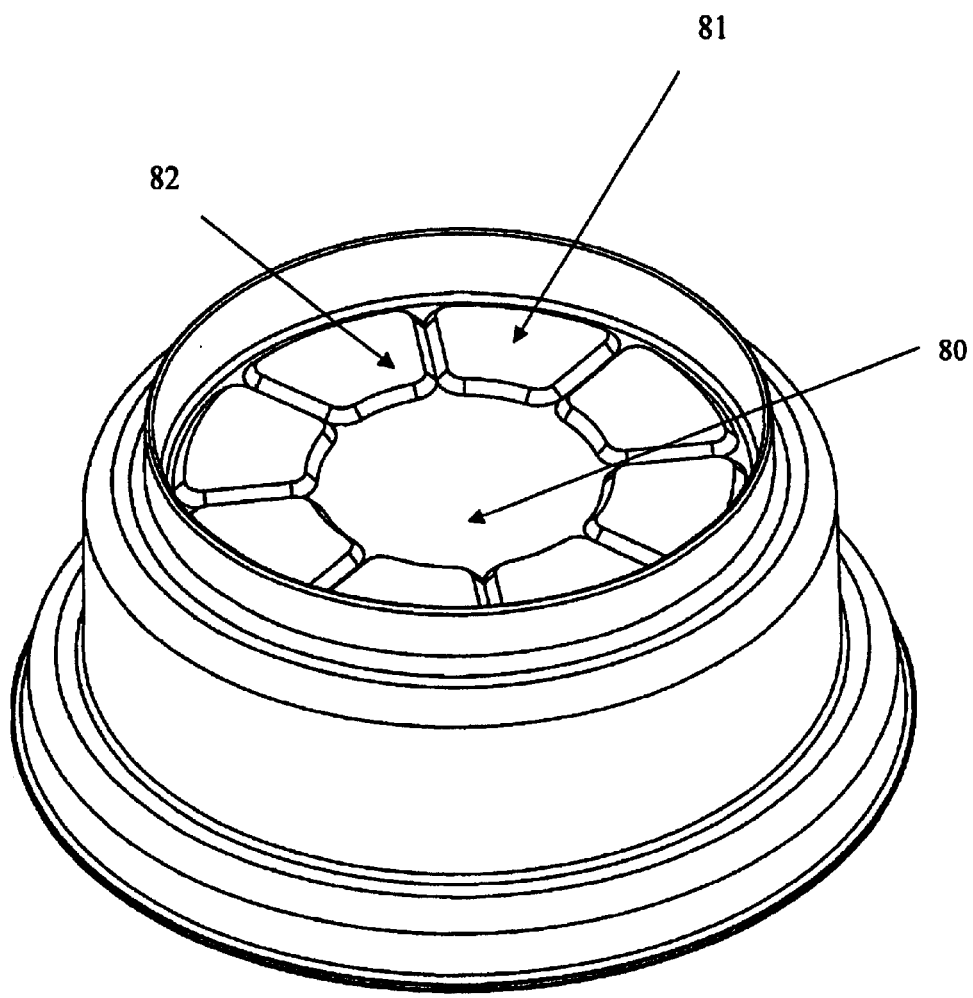
FIG. 11 is a perspective view of an alternate embodiment of the breakable barrier formed in the lower water cup.

In one preferred embodiment, breakable barrier 19 will be made of two sections. The first section will be formed in the middle of breakable barrier 19 and will generally be a circular area with a diameter of about 20 mm and a thickness of about 0.05 mm to 0.25 mm. Alternatively, the first section could have a break line or some other intentionally formed defect in the plastic. The second section (outside of the 20 mm diameter centre) will preferably be at least about 0.3 mm–0.4 mm thick but could also be about 0.2 mm–0.6 mm thick. The upper limit of thickness is not critical except in relation to the cost of using excessive plastic or requiring excessive cooling time. It is desirable to also have break lines in the second section to insure it may give way against expanding lime as explained below. One variation of this preferred embodiment is seen in FIG. 11. FIG. 11 shows a thinner center section 80 which does not require a break line in the center section. Formed around center section 80 are a series of thicker peripheral sections 81. Unlike center section 80, the peripheral sections 81 are separated by break lines 82 which have a reduced thickness (similar to that of center section 80). Without the thicker peripheral sections 81, there could be the opportunity for center section 80 to flex so far upward as the piercing point of the actuator presses against it, that center point 80 could simply be displaced and not pierced. However, peripheral sections 81 make the breakable barrier sufficiently rigid that center section 80 cannot avoid piercing by flexing away from the piercing point. In operation, after center section 80 has been pierced and the lime and water mix, the lime generally begins to expand. It is preferable to have the entire breakable barrier give_way and allow the lime to expand into lower cup 15. The break lines 82 help insure the now pierced breakable barrier will more easily split apart and allow the lime to expand into lower cup 15. Naturally the breakable barrier design of FIG. 11 could be used in other embodiments of the present invention, such as a substitute for the breakable barrier 55 seen in FIG. 6.

End cap 22 also should not deform under the quicklime reaction temperatures and should be impermeable to water in its liquid and vapor phases. However, end cap 22 should flexible enough that actuator 23 may move forward when actuator button 24 is pressed and the structural integrity of end cap 22 not be impaired. In an alternate preferred embodiment, end cap 22 will be constructed of a polypropylene (PP) random copolymer. Generally, it is preferred that the copolymer have a melt flow index of about 20, a flexural modulus of less than 900 MPa, and that the material have good clarity. End cap 22 may be formed through any suitable process such as an injection molding process or a vacuum molding process. One suitable copolymer is produce by SCT Corporation located in Thailand and is sold under the band name "EL-PRO" and the manufacturer number W03/Y44 #3. Another suitable copolymer is produce by BASF Corporation located in Germany and is sold under the brand name "Novolen" and the manufacturer number 3340 NC. The preferred embodiment of end cap 22 shown in the figures should have a wall thickness of greater than about 0.3 mm and should have a VSP of at least about 120° C. Naturally actuator 23 may be formed of a somewhat greater thickness to insure it has sufficient rigidity to puncture breakable barrier 19.

Figure 6:
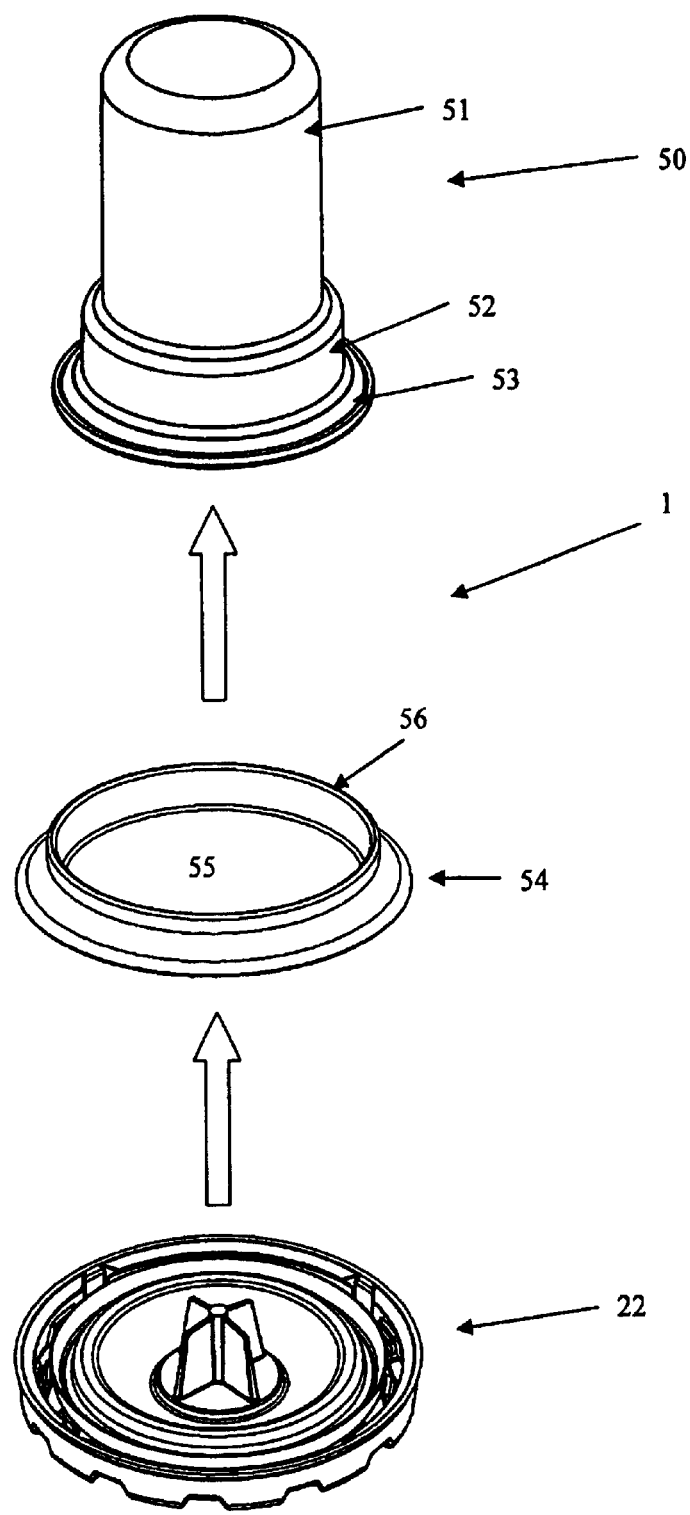
FIG. 6 illustrates an alternative embodiment of the thermic module.
Figure 7:
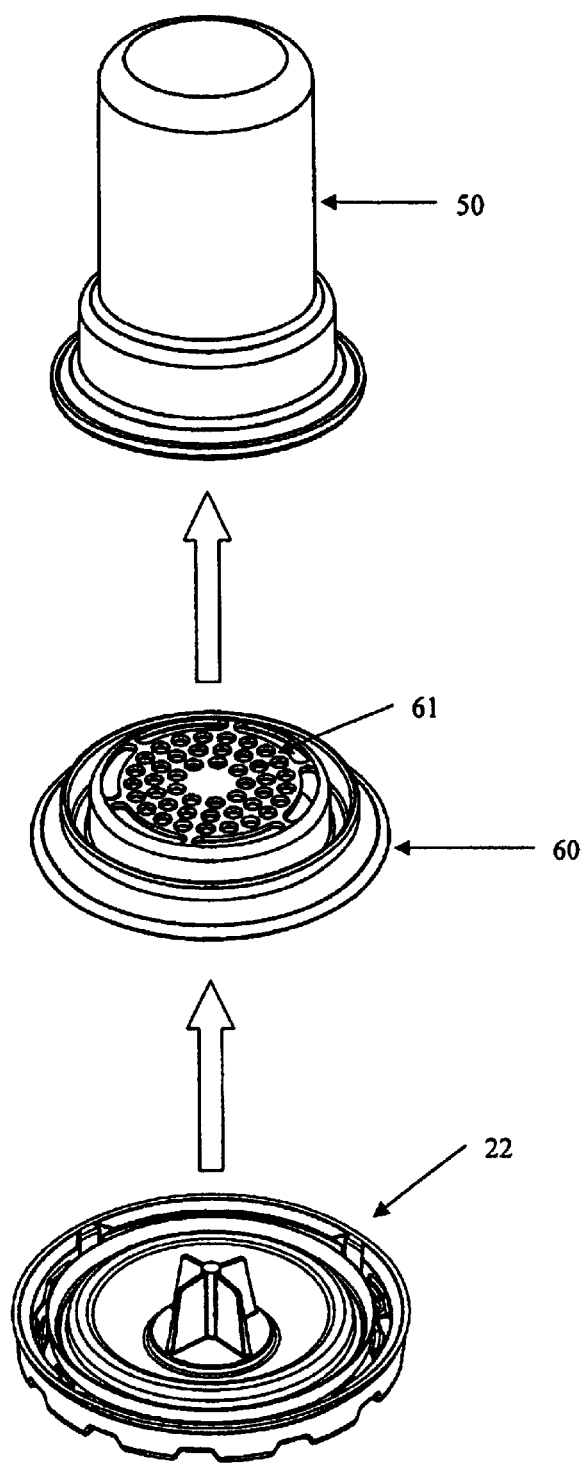
FIG. 7 illustrates an another alternative embodiment of the thermic module.
Figure 8:
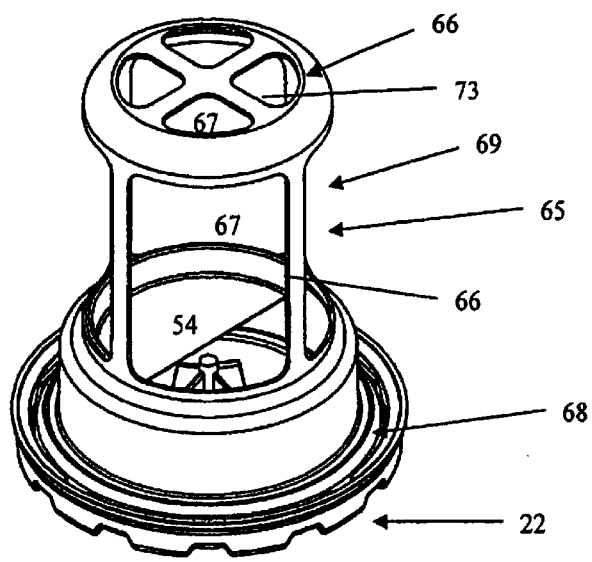
FIG. 8 illustrates a third alternative embodiment of the thermic module.

Still further embodiments of the present invention may be seen in FIGS. 6–8. FIG. 6 illustrates an embodiment where integral cup 50 is composed of upper cup sidewalls 51, lower cup sidewalls 52 and bottom rim 53. A dividing wall insert 54 with sealing ring 56 and breakable barrier 55 will fit into integral cup 50 and come to rest at the junction of sidewalls 51 and 52. The bottom rim 53 will engage end cap 22 as previously described. It can easily be understood how a first reactant chamber or cup is formed in the space above breakable barrier 55 and a second reactant chamber or cup is formed in the space between breakable barrier 55 and end cap 22. In all other aspects, the thermic module 1 seen in FIG. 6 will operate in the same manner as the previously described thermic module.

FIG. 7 illustrates an alternate dividing wall insert 60. The breakable barrier 61 will have a perforated support frame which will support a water impermeable sheeting material such as metal foil. Often a breakable barrier constructed only of a sheeting material will be unduly weak and subject to unintentional breakage. However, the addition of a support frame makes a breakable barrier of sheeting material far more reliable. The actuator 23 discussed above with cutting edges and spreading edges would insure penetration of the breakable barrier.

FIG. 8 illustrates an embodiment of thermic module 1 similar to that in FIG. 6 in regards to dividing wall insert 54, lower cup sidewalls 68, and end cap 22. However, the upper cup section 69 is of a significantly different design. The upper cup section 69 will be formed by frame structure 66 which creates a series of windows 67 in place of the solid upper cup walls seen in previous embodiments. Rather than solid plastic sidewalls previously described, upper cup section 69 will have sheeting material 73, such as metal foil, positioned within the windows 67. While only one window 67 is shown with sheeting material 73 for simplicity, it will be understood that all windows 67 would be covered with sheeting material 73. The sheeting material 73 will be attached to frame structure 66 by a convention means such as a high temperature adhesive, heat stamping, spray glue, hot glue, or any other suitable convention method. Sheeting material 73 may be secured in windows 67 such that it contains a certain degree of extra material or "slack". In this manner, when the thermic module is activated and internal pressure builds in upper section 69, sheeting material will bulge outward slightly from windows 67 and thus insure a large contact area (to maximize heat transfer) between the internal walls of the container's cavity and sheeting material 73.

While the foregoing description illustrates several alternate embodiments, the present invention is not limited to these particular configurations. For example, while the embodiments shown in all Figures (except FIG. 8), illustrate the elements of the thermic module formed of plastic, the scope of the present invention encompasses thermic module elements form of different materials. For example, the upper cup could be formed of aluminum have a thickness of 0.05 to 0.1 mm. While aluminum exhibits some of the disadvantages associated with the prior art, the use of the above disclosed quicklime to water ratios and positive pressure modules can make aluminum inserts a viable alternative. Additionally, the present invention could obviously include a method of using the novel thermic module. For example, a method of assembling a self-heating container could include the following steps. First, a manufacturer would provide a container which includes an enclosed space for a food or beverage, a sealable top end on the enclosed space, and a bottom end with a thermic module cavity. The thermic module cavity would have internal walls extending toward the top end of the container. Second, the manufacturer would fill the enclosed space with a food or beverage and seal the top end. Third, the manufacturer would sterilize the sealed container and/or the contents therein. Finally, the manufacture would secure the thermic module in the cavity after the sterilization of the container. The term "sterilization" is intended to include within its definition, not just the complete elimination of all micro-organisms, but also lesser degrees of treatment common in the food industry such as, ultra high temperature (UHT) treatment, pasteurization, radiation treatment, or any other process for reducing micro-organisms or increasing the shelf-life of a product. These and all other obvious variations are intended to come within the scope of the following claims.

I claim:

1. A thermic module for a self-heating container, wherein said container includes a bottom end with a cavity having internal walls formed therein for receiving said thermic module, said thermic module further comprising:
   a. a first cup having plastic walls and containing a first chemical reactant;
   b. a second cup containing a second chemical reactant;
   c. a dividing wall positioned between said first and second cups such that said first and second chemical reactants cannot mix;
   d. an end cap positioned below said second cup and retaining said second chemical reactant within said second cup;
   e. an actuator for puncturing said dividing wall positioned between said end cap and said dividing wall; and
   f. wherein said walls of said first cup are formed of a plastic having a Vicat Softening Point of less than 140° C.

2. The thermic module of claim 1, wherein said Vicat Softening Point is between about 120° C. and about 60° C.

3. The thermic module of claim 2, wherein said Vicat Softening Point is between about 90° C. and about 60° C.

4. The thermic module of claim 1, wherein said actuator comprises a piercing point, a sharper cutting edge extending laterally from said piercing point, and a blunter spreading edge extending laterally from said piercing point.

5. The thermic module of claim 1, wherein said actuator has a plurality of cutting edges and a plurality of spreading edges.

6. The thermic module of claim 1, wherein said walls of said first cup have a thickness of between about 0.001 and 0.3 mm.

7. The thermic module of claim 6, wherein said walls of said first cup have a thickness of between about 0.05 and 0.3 mm.

8. The thermic module of claim 7, wherein said walls of said first cup have a thickness of between about 0.1 and 0.2 mm.

9. The thermic module of claim 1, wherein said walls of said first cup are formed at least predominantly either polystyrene or polyvinyl chloride.

10. The thermic module of claim 1, wherein said second cup includes a side wall connecting to said dividing wall and said side wall of said second cup has a thickness of at least about 0.3 mm and said dividing wall has a thickness of about 0.2 mm.

11. The thermic module of claim 9, wherein said second cup is formed of a plastic having a Vicat Softening Point of greater than about 120° C.

12. The thermic module of claim 4, wherein said actuator is formed of a plastic having a Vicat Softening Point of greater than about 120° C. and a thickness of greater than about 0.3 mm.

13. The thermic module of claim 1, wherein side walls of said second cup are attached to said first cup and a separately formed dividing wall is positioned within said sidewalls of said second cup.

14. The thermic module of claim 13, wherein said separately formed dividing wall includes a perforate frame structure with a separate layer of sheeting material formed thereover.

15. The thermic module of claim 14, wherein said sheeting material is aluminum foil.

16. A self-heating container, wherein said container includes a bottom end with a cavity having internal walls formed therein for receiving a thermic module, said thermic module further comprising:
   a. a first chemical reactant positioned in said cavity;
   b. a cup containing a second chemical reactant said cup having a lip engaging said internal walls of said cavity;
   c. a dividing wall positioned between said first and second reactants such that said reactants are not in contact;
   d. an end cap positioned below said cup and retaining said second chemical reactant within said cup;
   e. an actuator for puncturing said dividing wall, said actuator positioned to be activated by pressure on said end cap; and
   f. a pressure activated vent comprising a vent seal positioned between said end cap and said cup lip such that said vent seal is compressed by said end cap engaging said bottom end of said container and a pressure created by the mixing of said first and second reactants must exceed about 2 psi before said vent is activated.

17. The self-heating container of claim 16, wherein said vent is activated by a pressure of between about 4 and about 7 psi.

18. The self-heating container of claim 16, wherein said vent seal is attached to and extends upwardly from said end cap.

19. The self-heating container of claim 16, wherein said first chemical reactant is positioned within a cup inside said cavity.

20. The self-heating container of claim 16, wherein the ratio by weight of a solid reactant to a liquid reactant is between about 0.2 and 0.5.

21. The self-heating container of claim 20, wherein the ratio by weight of a solid reactant to a liquid reactant is between about 0.3 and 0.4.

22. The self-heating container of claim 21, wherein the ratio by weight of a solid reactant to a liquid reactant is about 0.36.

23. A method of assembling a self-heating container comprising the steps of:
   a. providing a metal container which includes an enclosed space for a food or beverage, a sealable top end on said enclosed space, and a bottom end with a thermic module cavity having metal internal walls extending toward said top end;
   b. filling said enclosed space with a food or beverage and sealing said top end;
   c. sterilizing said sealed container;
   d. providing a thermic module which includes a plastic outer module wall and two reactants separated by an internal breakable barrier wall positioned within said thermic module; and
   e. after said sterilization step, securing in said thermic module in said cavity.

24. The method according to claim 23, wherein said step of providing said thermic module includes providing a thermic module which is capable of heating said food or beverage at least 40° C. in about 180 seconds.

25. A self-heating container comprising:
   a. a metal container body having an enclosed volume for receiving a beverage and a bottom end with a cavity formed of metal internal walls extending upward into said enclosed volume;
   b. a thermic module sized to be inserted within said cavity, said thermic module including:
      i. a plastic cup containing a first chemical reactant and shaped to extend into said cavity and fit within close proximity to said metal internal walls, a dividing wall positioned between said first chemical reactant and a second chemical reactant such that said reactants are not in contact;
      ii. an end cap positioned below said cup; and
      iii. an actuator for puncturing said dividing wall, said actuator positioned to be activated by pressure on said end cap.

* * * * *